United States Patent
Kawasaki

(10) Patent No.: US 9,333,865 B2
(45) Date of Patent: May 10, 2016

(54) CHARGING CONTROL DEVICE FOR ELECTRICALLY DRIVEN VEHICLE, AND VEHICLE INCORPORATING SAME

(71) Applicant: HONDA MOTOR CO., LTD., Minato-Ku, Tokyo (JP)

(72) Inventor: Yuichi Kawasaki, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 678 days.

(21) Appl. No.: 13/803,301

(22) Filed: Mar. 14, 2013

(65) Prior Publication Data

US 2013/0257150 A1    Oct. 3, 2013

(30) Foreign Application Priority Data

Mar. 29, 2012  (JP) ................................. 2012-075545

(51) Int. Cl.
H02J 7/00 (2006.01)
B60L 11/18 (2006.01)

(52) U.S. Cl.
CPC ......... *B60L 11/1811* (2013.01); *B60L 11/1812* (2013.01); *B60L 11/1816* (2013.01); *B60L 11/1846* (2013.01); *Y02T 10/7005* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC . B60L 11/1811; B60L 11/1846; Y02T 90/14; Y02T 90/169
USPC ................. 320/104, 134, 162, 164; 307/10.1; 701/22
See application file for complete search history.

(56) References Cited

U.S. PATENT DOCUMENTS

| 8,417,400 B2* | 4/2013 | Toth ........................ B60L 11/14 701/22 |
| 2011/0288705 A1 | 11/2011 | Kawasaki et al. |
| 2012/0025763 A1 | 2/2012 | Hsiao et al. |
| 2012/0123625 A1* | 5/2012 | Ueo ........................ B60L 3/003 701/22 |

FOREIGN PATENT DOCUMENTS

EP          2 644 442 A2    10/2013
JP          2011-139572 A    7/2011

OTHER PUBLICATIONS

"(R) SAE Electric Vehicle Conductive Charge Coupler", Surface Vehicle Recommended Practice, SAE The Engineering Society for Advancing Mobility Land Sea Air and Space International, SAE J1772 Revised Nov. 2011.

* cited by examiner

*Primary Examiner* — Edward Tso
*Assistant Examiner* — Aaron Piggush
(74) *Attorney, Agent, or Firm* — Carrier Blackman & Associates, P.C.; Joseph P. Carrier; William D. Blackman

(57) ABSTRACT

A charging control device includes a power drive unit (PDU) for performing a drive control of a motor and a charging control of a battery, a first converter which sets an input voltage from a charger to a charge voltage for the battery, a second converter which sets an output voltage of the first converter to a drive voltage for the PDU, and a charging coupler for connecting the charger with a power supply device. The charger outputs a charge voltage in response to the detection of the connection of the coupler based on an identification voltage applied to the charging coupler. The charger is subjected to a constant voltage control, and an output voltage is set at the maximum output current or above. The PDU monitors the output voltage of the charger, and controls a charge current such that the output voltage is maintained at a constant voltage.

20 Claims, 5 Drawing Sheets

CHARGING CONTROL DEVICE FOR ELECTRICALLY DRIVEN VEHICLE, AND VEHICLE INCORPORATING SAME

CROSS-REFERENCE TO RELATED APPLICATIONS

The present invention claims priority under 35 USC 119 based on Japanese patent application No. 2012-075545, filed on Mar. 29, 2012. The entire subject matter of this priority document, including specification claims and drawings thereof, is incorporated by reference herein.

BACKGROUND OF THE INVENTION

1. Field of the Invention

The present invention relates to a charging control device for an electrically driven vehicle. More particularly, the present invention relates to a charging control device for an electrically driven vehicle suitable for imparting general-use property to a charger for charging a battery in the electrically driven vehicle from outside of the electrically driven vehicle.

2. Description of the Background Art

There is a known charger for charging a battery mounted on an electrically driven vehicle from outside of the electrically driven vehicle. An example of such charger is disclosed in the Japanese Patent document JP-A-2011-139572, which proposed a charging coupler for connecting a charger which includes: a PFC circuit (also referred to as an output circuit) which constitutes a power-factor improving circuit connected to an AC plug; a converter which is connected to an output side of the PFC circuit; and a charging power generation part having an FET which constitutes a switching means for controlling an output of the converter to an electrically-driven vehicle.

The charger described in the Japanese Patent document JP-A-2011-139572 has a function of adjusting a charge voltage or a charge current in conformity with the performance of a vehicle-mounted battery, and the charger is provided for a dedicated use in conformity with the performance of the battery.

However, there has been a demand for imparting general-use property to a charger by preventing the charger from being used for a dedicated use due to the difference in a charge voltage or performance.

Accordingly, it is one of the objects of the present invention to provide a charging control device for an electrically driven vehicle which can simplify the connection between a vehicle and a charger by imparting general-use property to the charger to cope with the above-mentioned task of the related art.

SUMMARY OF THE INVENTION

In order to achieve the above objects, the present invention according to a first aspect thereof provides a charging control device for an electrically driven vehicle. The charging control device includes a power supply device (11) which includes a power drive unit (PDU) (45) for performing a drive control of a motor (18) constituting a vehicle-use drive source and a charging control of a battery (4) mounted on a vehicle; and a charger (10) which is provided outside the vehicle and is connected to the power supply device (11) by a charging coupler (13). The charger (10) includes, for determining the connection between the charger (10) with the power supply device (11), a control unit (103) which includes: an identification voltage applying unit (57) which applies an identification voltage on which a current limitation is imposed to the charging connector (13) and a connection detection unit (55) which starts outputting of a charge voltage in response to the detection of dropping of the identification voltage to a scheduled voltage or below. The charging control device includes, on a vehicle body side, a charging voltage generating converter (111) which sets a voltage inputted from the charger (10) to a voltage suitable for charging the battery, a control voltage generating converter (112) which sets an output voltage of the charging voltage generating converter (111) to a drive voltage for the PDU (45), and a contactor (8) which connects an output of the charging voltage generating converter (111) to the battery (4) in response to a command from the PDU (45).

The present invention according to a second aspect thereof is characterized in that the charger (10) includes an output circuit (102) having a drooping characteristic where a constant voltage control is performed at an output current below a maximum output current and an output voltage drops at the maximum output current or above.

The present invention according to a third aspect thereof is characterized in that the PDU (45) includes: a voltage monitoring unit (VMU) (45A) which monitors an output voltage from the charger (10), and a current control unit (CCU) (45B) which controls a charge current of the charging voltage generating converter (111), and the current control unit (45B) is configured to control a charge current such that the output voltage is maintained at a constant voltage.

The present invention according to a fourth aspect thereof is characterized in that the PDU (45) includes: a voltage monitoring unit (VMU) (45A) which monitors an output voltage from the charger (10), and charging of the battery (4) is inhibited when the output voltage falls outside a preset charge permissible voltage range.

The present invention according to a fifth aspect thereof is characterized in that the PDU (45) includes a voltage monitoring unit (45A) which monitors an output voltage from the charger (10), and charging of the battery (4) is inhibited by turning off the contactor (8) when the output voltage falls outside the preset charging permissible voltage range.

The present invention according to a sixth aspect thereof is characterized in that the PDU (45) operable to detect full charging of the battery (4), turn off the contactor (8) when the full charging is detected, and notify a charger (10) side of the full charging by outputting a charging stop signal.

Advantages of the Invention

According to the first aspect of the present invention, the applying of the charge voltage can be started in response to the detection of the connection of the charger to the vehicle body side based on lowering of the voltage which occurs when the charger provided outside the vehicle is connected to the vehicle body side. Also, it is sufficient that the charging voltage generating converter on the vehicle body side converts the applied voltage into the predetermined voltage suitable for charging the battery and outputs the predetermined voltage. Hence, the charger per se has general-use property by which the charger can largely correspond to the charge voltage of the battery irrelevant to the charge voltage of the battery dedicated to the vehicle body side.

According to the second and third aspects of the present invention, the charging voltage generating converter can ensure the general-use property of the charger using the simple constitution where an electric current is increased until a supply voltage is lowered and the electric current is decreased when lowering of the supply voltage is started.

According to the fourth and fifth aspects of the present invention, when the output voltage from the charger falls outside the charging permissible voltage range of the battery, charging is inhibited. More specifically, driving of the contactor is inhibited so that charging is not performed. Hence, the battery is protected.

According to the sixth aspect of the present invention, charging stop timing can be determined based on whether or not the battery is fully charged.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Hereinafter, an illustrative embodiment of the present invention is explained in conjunction with drawings.

Figure 1:
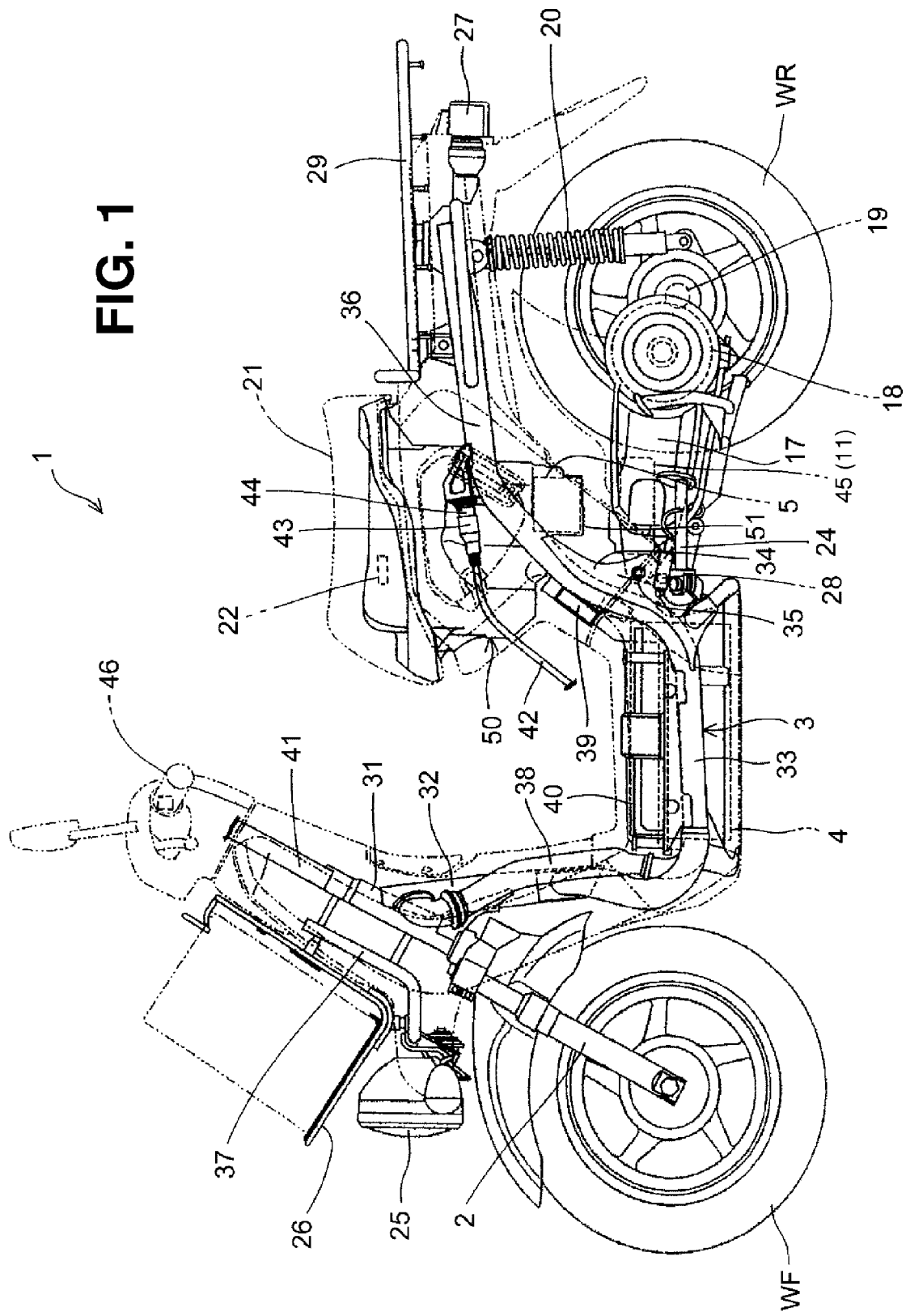
FIG. 1 is a side view of an electrically driven vehicle on which a charging control device according to an illustrative embodiment of the present invention is mounted.

FIG. 1 is a left side view of an electrically driven vehicle, which includes a charging control device according to an illustrative embodiment of the present invention.

An electrically driven vehicle 1 is a scooter-type motorcycle having a low floor. A vehicle body frame 3 includes a head pipe 31; a front frame portion 32 which has a distal end thereof joined to the head pipe 31 and has a rear end thereof extending in a downward direction; a pair of main frame portions 33 which is bifurcated leftward and rightward in the widthwise direction of a vehicle body from the front frame portion 32 respectively and extends to an area near a rear side of the vehicle body; and a rear frame portion 36 which extends to an upper rear side of the vehicle body from the main frame portions 33.

A front fork 2, which supports a front wheel WF, is steerably supported on the head pipe 31. A steering handle 46 having an acceleration grip is connected to an upper portion of a steering shaft 41 which extends upwardly from the front fork 2. The steering handle 46 is supported on the head pipe 31.

A bracket 37 is joined to a front portion of the head pipe 31. A headlight 25 is mounted on a front end portion of the bracket 37. A front carrier 26 which is supported on the bracket 37 is arranged above the headlight 25.

A bracket 34 which extends toward the rear side of the vehicle body is joined to the vehicle body frame 3 at an intermediate region between the main frame portion 33 and the rear frame portion 36. A pivot shaft 35 which extends in the widthwise direction of the vehicle body is mounted on the bracket 34. The pivot shaft 35 supports a swing arm 17 which includes a motor 18 as a drive source of the vehicle and a rear-wheel axle 19 in a vertically swingable manner. An output of the motor 18 is transmitted to the rear-wheel axle 19 so as to drive a rear wheel WR which is supported on the rear-wheel axle 19. A rear end of a housing which supports the rear-wheel axle 19 and the rear frame portion 36 are connected to each other by a rear suspension 20.

A side stand 24 which supports the vehicle body during stopping of the vehicle is mounted on the bracket 34. The side stand 24 includes a side stand switch 28 which outputs a detection signal when the side stand 24 is retracted to a predetermined position.

A main battery 4 of a high voltage (for example, a rated voltage of 72V) which is formed of a plurality of battery cells is mounted on the main frame portions 33. An upper portion of the main battery 4 is covered with a cover 40. An air introducing pipe 38 is connected to a front portion of the main battery 4. An air suction fan 39 is mounted on a rear portion of the main battery 4. Air is introduced into the main battery 4 from the air introducing pipe 38 by operating the air suction fan 39. The introduced air cools the main battery 4 and, thereafter, is discharged to a rear side of the vehicle body. Air is introduced into the air introducing pipe 38 through an air cleaner (not shown).

A socket 44 is mounted on an upper portion of the rear frame portion 36. A plug 43 of a charging cable 42 which extends from a charger 10 (described later) for charging the main battery 4 is connectable to the socket 44. A rear carrier 29 and a tail light 27 are mounted on the rear frame portions 36.

A storage chamber 50 is arranged between the pair of left and right rear frame portions 36. A sub battery 5 of a low voltage (for example, a rated voltage of 12V) which is charged by the main battery 4 is housed in a storage-chamber bottom portion 51 which projects downwardly from the storage chamber 50. A power drive unit (PDU) 45, which controls the motor 18, is mounted on the swing arm 17.

A rider's seat 21, which also functions as a lid for the storage chamber 50, is arranged above the storage chamber 50. A seat switch 22 which is operated when a rider sits on the rider's seat 21 and outputs a sitting signal is mounted on the rider's seat 21.

Figure 2:
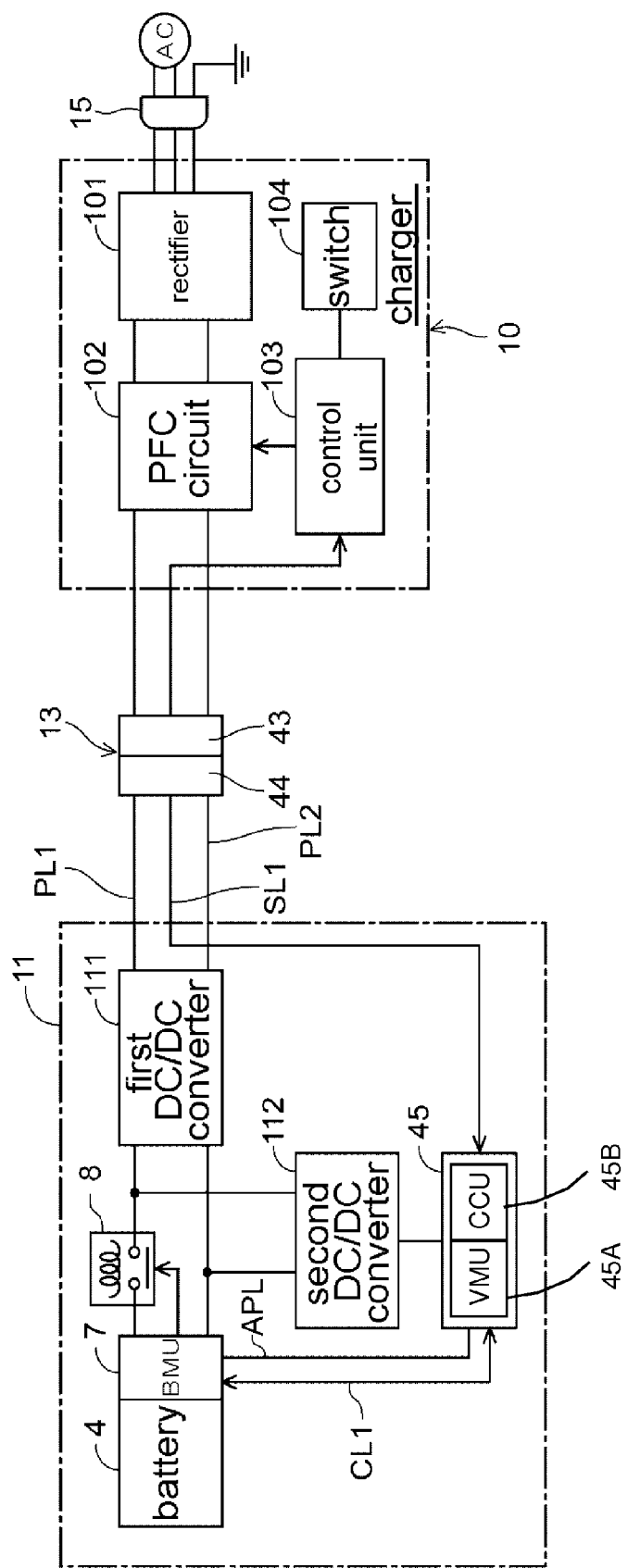
FIG. 2 is a block diagram showing the constitution of the charging control device according to the illustrative embodiment of the present invention.

FIG. 2 is a block diagram showing the constitution of the charging control device.

The charging control device includes charger 10, a power supply device 11 on an electrically driven vehicle 1 side, and a charging coupler 13 for connecting the charger 10 and the power supply device 11 with each other. The power supply device 11 includes a circuit for controlling power to be supplied to the motor 18 by the PDU 45 and for charging the battery 4. The charging coupler 13 includes a plug 43 which is connected to a charger 10 side and the socket 44 on the vehicle side. The charger 10 and the power supply device 11 are connected to each other by power lines PL1, PL2 and a signal line SL1 via the coupler 13.

The charger 10 includes a rectifier 101, a PFC circuit 102 (also referred to as an output circuit 102) as a power-factor improving circuit, and a control unit 103. The rectifier 101 includes a filter circuit and a rectifying circuit, and rectifies a voltage which is inputted from a commercial AC power system via an AC plug 15 to a direct current. The PFC circuit 102 is an output circuit which boosts the direct current inputted from the rectifier 101, and supplies the boosted direct current to the power supply device 11 on the vehicle side.

The control unit 103 which includes a microcomputer always monitors an output voltage of the PFC circuit 102, and performs a constant voltage control so as to prevent the output voltage from surpassing a set voltage (for example, 400V). A charging start/stop switch 104 is connected to the control unit 103.

Further, the control unit 103 also has a function of starting the charging in response to a connection detection signal indicative of the connection of the charging coupler 13 or a function of stopping the charging in response to a charging stop signal transmitted from the vehicle side via the signal line SL1.

The power supply device 11 on the electrically driven vehicle 1 side includes the main battery 4 having a battery management unit (BMU) 7 (hereinafter simply referred to as "battery"), the PDU 45, a first DC/DC converter 111, and a second DC/DC converter 112. The first DC/DC converter 111 is a charging voltage generating converter which drops (sets) a voltage inputted through the power lines PL1, PL2 (400V in this embodiment) to a charge voltage (72V) for the battery 4 and outputs the dropped voltage.

An output side of the first DC/DC converter 111 is connected to the battery 4 and the second DC/DC converter 112. The second DC/DC converter 112 is a control voltage generating converter which drops (sets) a direct current of 72V outputted from the first DC/DC converter 111 to a low voltage (for example, a direct current of 12V) which can be used as the power source for controlling the PDU 45 or the like.

The PDU 45 includes a microcomputer, and transmits and receives a charging state (overcharge information or the like) of the battery 4 and information on a control of the battery 4 corresponding to the charging state of the battery 4 through the communication (for example, CAN communication) with the BMU 7 via a communication line CL1.

Specifically, the PDU 45 includes a voltage monitoring unit (VMU) 45A which monitors an output voltage from the charger 10, and a current control unit (CCU) 45B which controls a charge current of the charging voltage generating converter 111. The current control unit 45B is configured to control a charge current such that the output voltage is maintained a constant voltage.

Here, the PDU 45 and the control unit 103 of the charger 10 are connected to each other via the signal line SL1. A DC output voltage of the battery 4 is converted into a three-phase AC voltage via an inverter circuit (not shown) which is mounted on the PDU 45, and is inputted to the motor 18 which constitutes the drive source of the vehicle (see FIG. 1). A contactor 8 is arranged between the BMU 7 which is mounted on the battery 4 and the first DC/DC converter 111.

The PDU 45 determines an ON/OFF condition of the contactor 8, and inputs an ON/OFF signal to the BMU 7. The BMU 7 opens or closes the contactor 8 in response to the ON/OFF signal. An auxiliary power line APL may be arranged between the PDU 45 and the BMU 7 in addition to the communication line CL1. Power from the battery 4 can be supplied to the PDU 45 through the auxiliary power line APL via the BMU 7.

Figure 3:
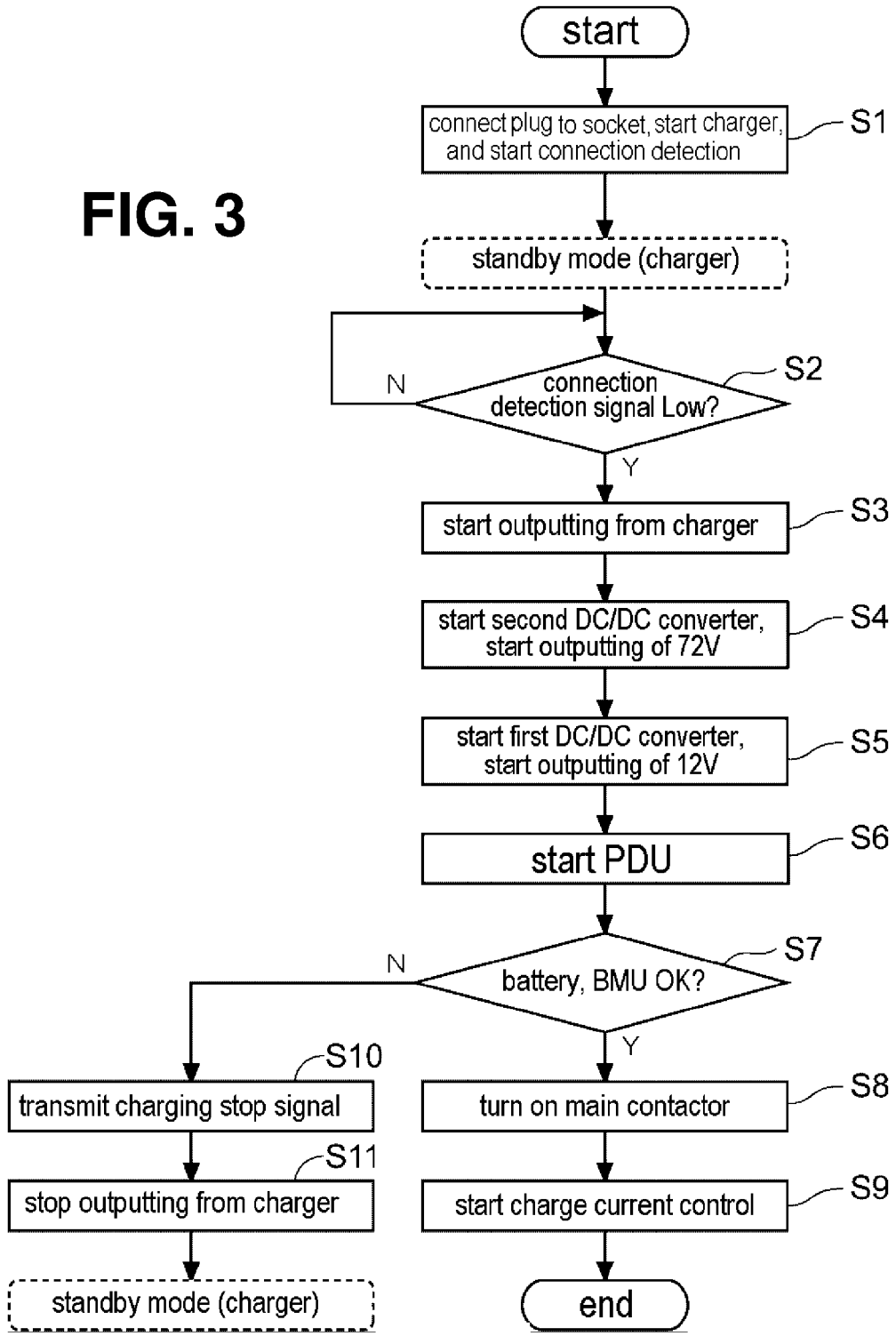
FIG. 3 is a flowchart showing the manner of operation of the charging control device.

The manner of operation of the charging control device is explained in conjunction with a flowchart shown in FIG. 3. FIG. 3 shows both the manner of operation of the charger 10 and the manner of operation of the power supply device 11.

As shown in FIG. 3, in step S1, the AC plug 15 is connected to an AC socket (an output part of a commercial power system), and the charging start/stop switch 104 which is connected to the control unit 103 is turned on so that the charger 10 is started. When the charger 10 is started, the control unit 103 of the charger 10 starts the detection of whether or not the plug 43 and the socket 44 of the charging coupler 13 are connected with each other (connection detection). Due to such processing, the charger 10 is brought into a standby mode.

In performing the connection detection, an extremely low voltage where an electric current is limited for the connection detection (hereinafter referred to as "identification voltage") is outputted to the power lines PL1, PL2 from the PFC circuit 102 of the charger 10, and the control unit 103 determines that the connection detection signal is LOW when the identification voltage is lowered to a value below a connection detection threshold value which is set in advance.

In step S2, the control unit 103 determines whether or not the connection detection signal is LOW. When the charging coupler 13 is connected, a voltage between the power lines PL1, PL2 drops due to an internal load of the first DC/DC converter 111 so that the voltage is lowered to a value equal to or smaller than the connection detection threshold value.

Accordingly, the lowering of the voltage is detected and a connection detection signal is changed to LOW from HIGH. When the connection detection signal is LOW, the processing advances to step S3 where an output start command is inputted to the PFC circuit 102 from the control unit 103 so that the charger 10 starts outputting of a rated voltage. The PFC circuit 102 is subject to a constant voltage control so that when an electric current equal to or more than the maximum capacity flows, the output voltage is rapidly lowered.

In step S4, the first DC/DC converter 111 is operated, and the outputting from the first DC/DC converter 111 is started. The first DC/DC converter 111 is automatically started at a point of time that power is supplied from the charger 10, and converts a DC voltage of 400V inputted from the PFC circuit 102 into a DC voltage of 72V and outputs the DC voltage of 72V.

In step S5, the second DC/DC converter 112 is operated, and the outputting from the second DC/DC converter 112 is started. In other words, the second DC/DC converter 112 converts a DC voltage of 72V inputted from the first DC/DC converter 111 into a DC voltage of 12V which is suitable as a control voltage for the PDU 45, and outputs the DC voltage of 12V.

In step S6, the PDU 45 is started. When the control voltage of 12V is inputted from the second DC/DC converter 112, the PDU 45 is started by this control voltage.

In step S7, the PDU 45 reads a state of the battery from the BMU 7, and determines whether or not a temperature, a voltage or the like of the battery 4 falls within a normal range. When the state of the battery 4 falls within a normal range, the processing advances to step S8 where the PDU 45 inputs an ON signal for the contactor 8 to the BMU 7, and the BMU 7 turns on the contactor 8 in response to the ON signal. When the contactor 8 is turned on, a charge current flows into the battery 4 from the first DC/DC converter 111.

Further, the PDU 45 is operable to monitor an input voltage to the first DC/DC converter 111 so that when the input voltage falls outside a permissible charge voltage range which is defined by a scheduled upper limit value and a scheduled lower limit value, the PDU 45 turns off the contactor 8 thus preventing the battery 4 from being charged.

In step S9, the control of a charge current is started. The first DC/DC converter 111 increases a charge current. The input voltage drops from 400V when the charge current exceeds the maximum capacity of the charger 10. Hence, the PDU 45 detects a maximum output of the charger 10 in response to the starting of the drop of the input voltage of the first DC/DC converter 111 thus finishing the increase of the charge current. The input voltage is boosted again by stopping the increase of the charge current, and the increase of the charge current is started again. Due to such a control, the battery 4 is charged with the maximum charge current.

When the determination in step S7 is negative, the processing advances to step S10 where the PDU 45 transmits a charging stop signal.

In step S11, the control unit 103 receives the charging stop signal and stops the outputting of the charger 10. When the charger 10 stops the outputting, a mode of the charger 10 is shifted to a standby mode.

Figure 4:
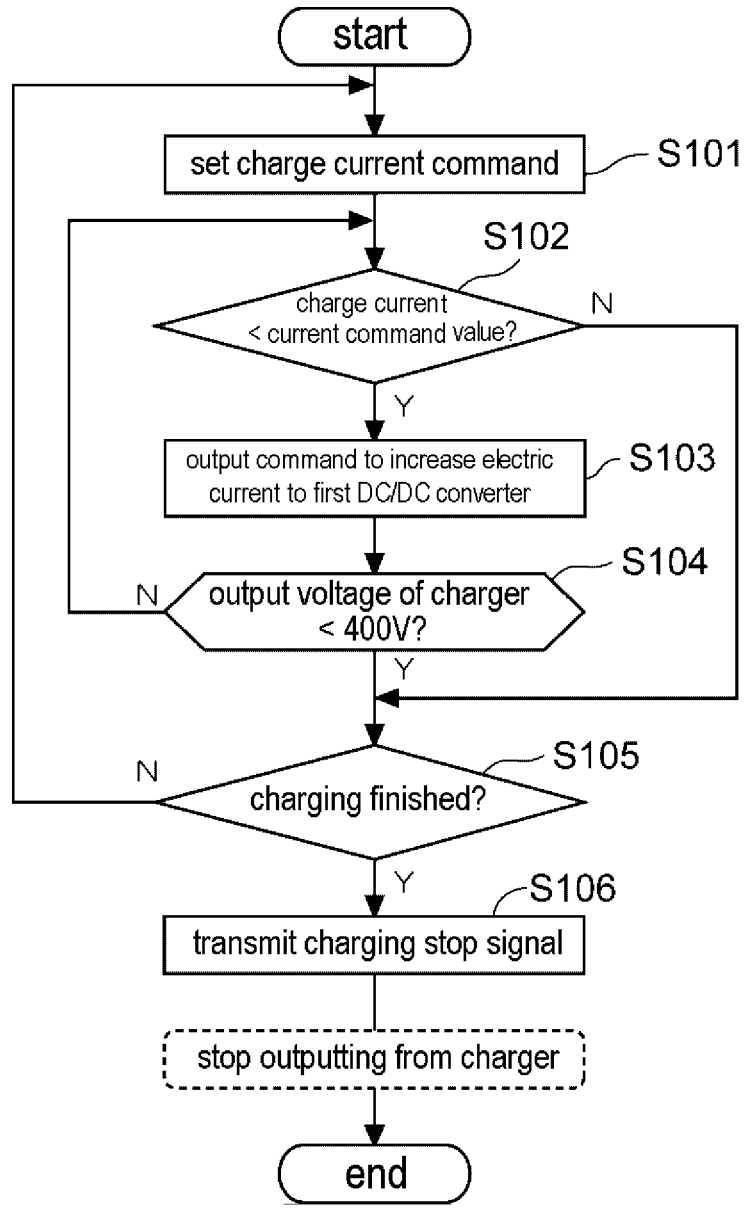
FIG. 4 is a flowchart showing the manner of operation of a PDU.

FIG. 4 is a flowchart showing the manner of operation of the PDU 45. In step S101, the PDU 45 sets a charge current command value to an initial value. In step S102, the PDU 45 determines whether or not a charge current is smaller than the charge current command value. When the charge current is smaller than the charge current command value, the processing advances to step S103 where the PDU 45 outputs a command to increase an electric current to the first DC/DC converter 111. In step S104, the PDU 45 determines whether or not an output voltage from the charger 10 drops.

In step S105, the PDU 45 determines whether or not the charging is to be finished. The determination becomes affirmative when the PDU 45 detects a full charge based on a voltage of the battery 4. When the determination in step S105 is affirmative, the processing advances to step S106 where the PDU 45 outputs a charging stop signal to the signal line SL1. The control unit 103 of the charger 10 makes the PFC circuit 102 stop the operation thereof in response to the charging stop signal.

Figure 5:
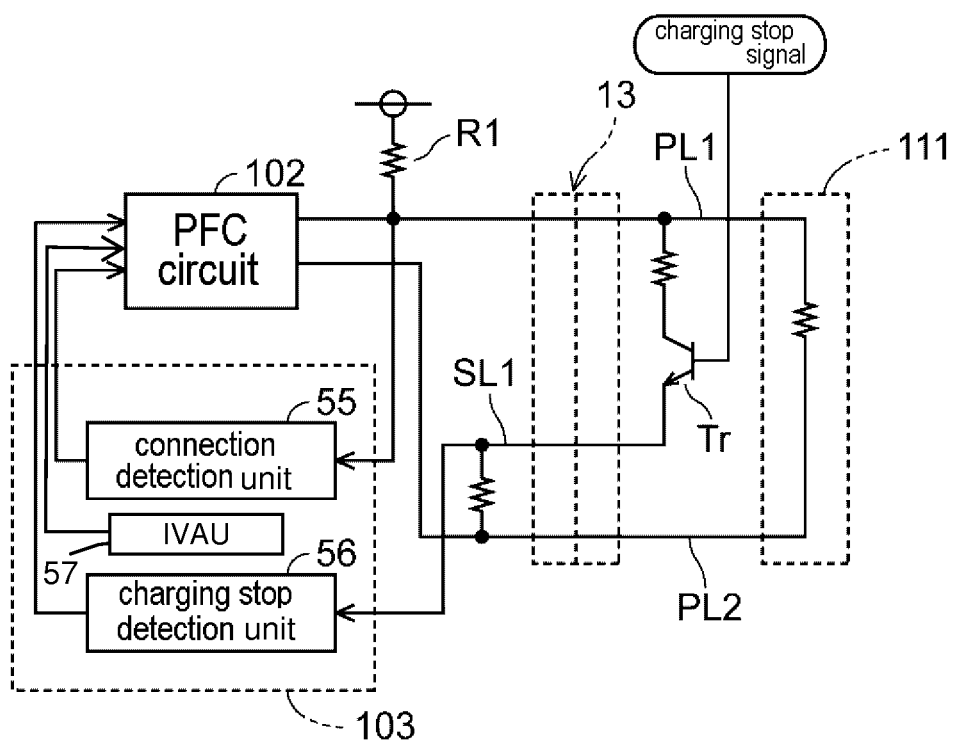
FIG. 5 is a diagram showing a function of a control unit of a charger.

FIG. 5 is a block diagram showing functions of an essential part of the charging control device including a connection detection unit which detects that the charger 10 and the power supply device 11 are connected to each other.

As shown in FIG. 5, the control unit 103 includes an identification voltage applying unit (IVAU) 57 which applies an identification voltage on which a current limitation is imposed to the charging coupler 13, and a connection detection unit 55 which starts outputting of a charge voltage in response to the detection of dropping of the identification voltage to a scheduled voltage or below.

Further, as shown in FIG. 5, an identification voltage is applied by the identification voltage applying unit (IVAU) 57 to an output terminal of the PFC circuit 102 via a current limiting resistance R1, and the identification voltage applied to the output terminal is monitored by a connection detection unit 55. When the coupler 13 is connected, an electric current flows in the first DC/DC converter 111 in the power supply device 11 and hence, the identification voltage drops. The connection detection unit 55 recognizes that the charging coupler 13 is connected in response to the detection of such a voltage drop.

In the power supply device 11 on the vehicle side, the signal line SL1 is connected to the power line PL1 via a transistor Tr. At the time of finishing the charging, the PDU 45 turns on the transistor Tr. The control unit 103 further includes a charging stop detection unit 56 which monitors a potential of the signal line SL1. When the transistor Tr is turned on in response to a charging stop signal which is inputted from the PDU 45, a voltage of the signal line SL1 is changed to a predetermined value. The charging stop detection unit 56 recognizes the inputting of the charging stop signal in response to the detection of such a voltage change in the signal line SL1, and stops the outputting from the PFC circuit 102.

In this manner, according to the charging control device of the illustrative embodiment, the charger 10 can start the charging in response to the detection of the presence or non-presence of the connection between the plug 43 and the socket 44 of the charging coupler 13 based on the drop of the identification voltage applied to the charging coupler 13. Further, the PFC circuit 102 of the charger 10 outputs a constant voltage until an output limit thereof. Hence, the PDU 45 can increase a charge current until the output voltage from the charger 10 drops. Accordingly, the charger 10 can supply the charge current to the battery 4 with a maximum output.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A charging control device for an electrically driven vehicle having vehicle-use drive source including a motor, said charging control device comprising:
    a battery mounted on said vehicle;
    a power supply device which includes a power drive unit (PDU) for performing a drive control of said motor and a charging control of said battery, said PDU being arranged on the vehicle; and
    a charging coupler;
    a charger which is provided outside the vehicle and is connected to the power supply device by the charging coupler;
    wherein:
    the charger comprises a control unit for determining the connection between the charger with the power supply device;
        said control unit comprising
            an identification voltage applying unit which applies an identification voltage on which a current limitation is imposed to the charging coupler; and
            a connection detection unit which starts outputting of a charge voltage in response to the detection of dropping of the identification voltage to a scheduled voltage or below; and
    said charging control device further comprises, on said vehicle,
    a charging voltage generating converter which sets a voltage inputted from the charger to a voltage suitable for charging the battery;
    a control voltage generating converter which sets an output voltage of the charging voltage generating converter to a drive voltage for the PDU; and
    a contactor which connects an output of the charging voltage generating converter to the battery in response to a command from the PDU.

2. The charging control device for an electrically driven vehicle according to claim 1, wherein the charger further comprises an output circuit having a drooping characteristic where a constant voltage control is performed at an output current below a maximum output current and an output voltage is controlled at the maximum output current or above.

3. The charging control device for an electrically driven vehicle according to claim 2,
    wherein the PDU comprises a voltage monitoring unit which monitors an output voltage from the charger, and a current control unit which controls a charge current of the charging voltage generating converter; and wherein the current control unit is configured to control a charge current such that the output voltage is maintained at a constant voltage.

4. The charging control device for an electrically driven vehicle according to claim 1,
wherein the PDU comprises a voltage monitoring unit which monitors an output voltage from the charger; and
wherein charging of the battery is inhibited when the output voltage falls outside a preset charge permissible voltage range.

5. The charging control device for an electrically driven vehicle according to claim 4, wherein said PDU is operable to inhibit charging of the battery by turning off the contactor when the output voltage falls outside the preset charging permissible voltage range.

6. The charging control device for an electrically driven vehicle according to claim 4, wherein said PDU is operable to: detect full charging of the battery, turn off the contactor when the full charging is detected, and notify the charger side of the full charging by outputting a charging stop signal.

7. The charging control device for an electrically driven vehicle according to claim 1, wherein the power supply device and charger are connected with each other by a plurality of power lines and a signal line via said charging coupler.

8. A charging control device for a motorcycle having a drive source; said charging control device comprising
a power supply device arranged on said motorcycle, and being operable to perform drive control of said drive source;
a charger arranged outside the motorcycle;
a coupler for operatively connecting said power supply device and said charger with each other; said coupler being mounted on said motorcycle, and having a charging cable extending therefrom;
wherein:
said power supply device comprises
a battery operatively connected with the drive source;
a power drive unit connected with battery and said drive source;
a first converter which sets a voltage inputted from the charger to a suitable voltage for charging the battery,
a second converter which sets an output voltage of the first converter to a drive voltage for the power drive unit, and
a contactor which connects an output of the first converter to the battery in response to a command from the power drive unit;
said charger comprises a control unit including
an identification voltage applying unit which applies an identification voltage on which a current limitation is imposed to the coupler; and
a connection detection unit which starts outputting of a charge voltage in response to detection of dropping of the identification voltage to a predetermined voltage or below.

9. A charging control device for a motorcycle according to claim 8, wherein the charger further comprises an output circuit having a drooping characteristic where a constant voltage control is performed at an output current below a maximum output current and an output voltage is controlled at the maximum output current or above.

10. A charging control device for a motorcycle according to claim 9, wherein the power drive unit comprises
a voltage monitoring unit which monitors an output voltage from the charger; and a current control unit which controls a charge current of the charging voltage generating converter; and
wherein the current control unit is configured to control a charge current such that the output voltage is maintained at a constant voltage.

11. A charging control device for a motorcycle according to claim 8, wherein the power drive unit comprises a voltage monitoring unit which monitors an output voltage from the charger; and wherein said power drive unit is operable to inhibit charging of the battery when the output voltage falls outside a predetermined voltage range.

12. A charging control device for a motorcycle according to claim 11, wherein said power drive unit is operable to inhibit charging of the battery by turning off the contactor.

13. A charging control device for a motorcycle according to claim 11, wherein the power drive unit is operable to detect full charging of the battery and to turn off the contactor when the full charging is detected.

14. A charging control device for a motorcycle according to claim 8, wherein the power supply device and charger are connected to each other by a plurality of power lines and a signal line via said coupler.

15. An electric vehicle comprising
an electric motor;
a coupler; and
a power supply device for supplying power to said electric motor; said power supply device being operable to connect with a charger located outside the vehicle via said coupler;
said power supply device comprising
a battery including a battery management unit;
a power drive unit connected with said battery management unit and said electric motor;
a first converter which sets a voltage inputted from the charger to a suitable voltage for charging the battery;
a second converter which sets an output voltage of the first converter to a drive voltage for the power drive unit; and
a contactor which connects an output of the first converter to the battery management unit in response to a command from the power drive unit;
wherein said charger is operable to apply an identification voltage on which a current limitation is imposed to the coupler; and to start outputting of a charge voltage in response to the detection of dropping of the identification voltage to a predetermined voltage or below.

16. An electric vehicle according to claim 15, wherein the charger comprises an output circuit having a drooping characteristic where a constant voltage control is performed at an output current below a maximum output current and an output voltage is controlled at the maximum output current or above.

17. An electric vehicle according to claim 16, wherein the power drive unit comprises a voltage monitoring unit which monitors an output voltage from the charger, and a current control unit which controls a charge current of the charging voltage generating converter, and wherein the current control unit is configured to control a charge current such that the output voltage is maintained at a constant voltage.

18. An electric vehicle according to claim 15, wherein the power drive unit comprises a voltage monitoring unit which monitors an output voltage from the charger; and
wherein said power drive unit is operable to inhibit charging of the battery when an output voltage falls outside a predetermined voltage range.

19. A charging control device for a motorcycle according to claim 18, wherein said power drive unit is operable to inhibit charging of the battery by turning off the contactor.

20. A charging control device for a motorcycle according to claim 15, wherein the power drive unit is operable to detect full charging of the battery and to turn off the contactor when the full charging is detected.

* * * * *